UNITED STATES PATENT OFFICE.

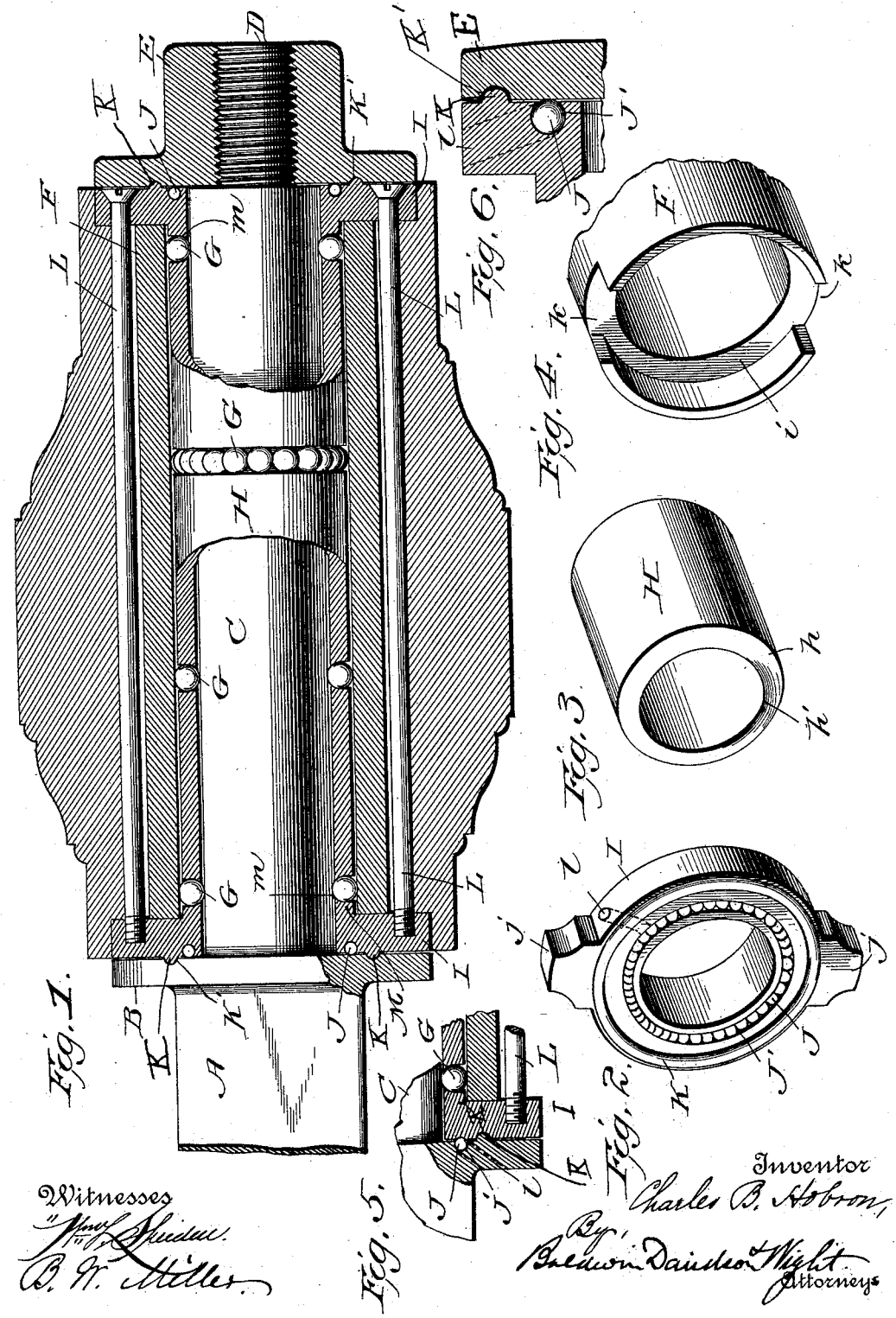

CHARLES B. HOBRON, OF BOERNE, TEXAS, ASSIGNOR OF ONE-THIRD TO SAMUEL S. EVELAND, OF PHILADELPHIA, PENNSYLVANIA.

ANTIFRICTION-BEARING.

SPECIFICATION forming part of Letters Patent No. 603,642, dated May 10, 1898.

Application filed April 7, 1897. Serial No. 631,132. (No model.)

*To all whom it may concern:*

Be it known that I, CHARLES B. HOBRON, a citizen of the United States, residing at Boerne, in the county of Kendall and State of Texas, have invented certain new and useful Improvements in Antifriction-Bearings, of which the following is a specification.

The object of my invention is to provide an improved antifriction-bearing for vehicle-hubs and the like, my special object being to provide improved means for affording antifriction-bearings for the ends of the hub and means for excluding dust from the bearings.

In the accompanying drawings, Figure 1 is a view, partly in longitudinal central section and partly in elevation, of a vehicle-hub and one end of an axle with my improvements applied. Fig. 2 is a perspective view of one of the caps or end pieces employed. Fig. 3 is a perspective view of one of the rings which surround the journal or arm of the axle. Fig. 4 is a perspective view of one end of the sleeve or casing which surrounds the axle. Fig. 5 is a detail view showing a modified way of excluding dust from the ball-bearings at the inner end of the sleeve. Fig. 6 is a detail view on an enlarged scale, showing the preferred way of excluding dust from the ball-bearings. This figure also shows the manner of arranging the balls in the undercut annular groove.

The end of the axle A is formed with a collar B and the journal or axle-arm C. The end of the axle-arm is screw-threaded at D to receive a nut E. A sleeve or casing F surrounds the journal, and between the casing and the journal are interposed a series of rows of balls G and a series of rings H. At each end of the casing F is arranged an end piece or cap I, each of which is provided with an annular series of balls J to receive end thrust and wear and an annular rib K to exclude dust. Each end piece is arranged to fit in a socket *i* in the end of the casing, and preferably each end piece is formed with wings *j*, fitting into corresponding recesses *k* in the sleeve and projecting therefrom to receive screw-rods L, which tie the end pieces at opposite ends of the casing together and extend through the wooden portion of the hub. Where wings are employed, the end pieces are prevented from turning relatively to the sleeve; but if the wings were omitted the end pieces would be free to rotate relatively to the sleeve and relatively to the journal. Each series of balls J is arranged in an annular undercut groove J' in the end piece, and the balls are inserted through a passage *l*, leading to the rear portion of the groove. This passage may be stopped by a suitable plug after the balls have been inserted. The annular rib K is arranged to enter a corresponding annular groove K' in the collar B or in the nut E. The arrangement may, however, be reversed and the groove formed in the end piece and the rib on the collar or on the nut, as indicated in Fig. 5. Each end piece is also formed with an annular flange M, concaved slightly at *m* to accommodate the adjacent annular series of balls.

In the drawings I have shown four sets of balls and three rings. The balls are so arranged as to each have two bearing-points only, one against the sleeve or casing and one against the journal. The rings have annular grooves *h* arranged on opposite sides of the balls; but these grooves are so formed as to clear the balls—that is to say, the rings do not press against the balls, nor do the balls with any wearing pressure press against the rings, it being desirable that each ball shall have two bearing-points only, as before stated, and these points should be on the journal and on the surrounding casing. Therefore the grooves at their inner ends terminate in fins *h'*, which project only a short distance under the balls, and the grooves at their upper ends are so wide that the rings do not more than merely touch the balls. In fact, they may be so arranged that the distance between the outer surfaces or edges of adjacent rings shall be greater than the diameter of the balls. The distance between the opposing or adjacent fins, however, should be a little less than the diameter of the balls, so that when the journal is removed the balls shall not drop out of place. It is likewise true that the distance between the end ring and the flange M on each end piece is such as to prevent a bearing contact, such as to exert a wearing pressure between the balls and the flange and ring, but the construction and arrangement are such as to hold the balls in place when the journal is removed.

In assembling the parts I preferably proceed as follows: The sleeve or casing F is driven into the wooden portion of the hub by hydraulic pressure or otherwise. Then one of the end pieces or caps is inserted into its recess in the casing. Then a mandrel corresponding approximately in size to the journal C is inserted through the opening in the end piece and through the sleeve or casing. Then the hub is turned to assume a vertical position. Then a sufficient number of balls to form an annular series is dropped in between the sleeve and mandrel. Then a ring is applied to the mandrel and dropped down upon the annular series of balls first inserted. Then another series of balls is inserted, then a ring, and so on until the casing is filled with balls and rings. Then the opposite end piece or cap I is applied, and the bolts L are driven home. The hub thus equipped may then be placed on the journal and the nut E applied. The rollers and rings can thus be very readily assembled, and the hub thus equipped can be easily taken off or removed from the journal without disarranging any of the parts of the bearing.

It will be observed that each end piece or cap is provided on one side with a ball-bearing to take end thrust, while on the opposite side it is provided with an annular flange forming a guide or support, or part of a support, for the adjacent series of balls.

By my improvements undue friction at the ends of the hub is avoided, and the end pieces or caps are so formed as to serve the double purpose of supporting the antifriction-balls which take end thrust and also support adjacent balls located inside of the hub.

The ribs and grooves surrounding the end-thrust ball serve to prevent the entrance of dust both to the end-thrust balls and also to the journal within the hub.

I claim as my invention—

1. An antifriction-bearing, having at one end an end piece or cap formed on its outer face with an undercut ball-groove and with a passage for the insertion of balls leading to the periphery of the cap and formed on its inner face with an annular flange having a grooved edge to accommodate a series of balls, and balls arranged in said undercut groove.

2. An antifriction-bearing, having at one end an end piece or cap formed on its outer face with an undercut ball-groove and an annular rib surrounding said groove, and balls arranged in said undercut groove.

3. The combination with an axle-arm, of a hub, a sleeve secured within the hub, a series of rows of balls interposed between the axle-arm and the sleeve, a series of rings interposed between the rows of balls, and a cap at each end of the hub formed on its outer face with an undercut groove, and a passage for the insertion of balls leading to the periphery of the cap and formed on its inner face with an annular flange having a grooved edge to accommodate a series of balls interposed between the cap and one of the rings within the hub, and balls arranged in the undercut groove of the caps.

In testimony whereof I have hereunto subscribed my name.

CHARLES B. HOBRON.

Witnesses:
  SAML. S. EVELAND,
  THOS. RICKARDS.